(12) United States Patent
Haghshenas et al.

(10) Patent No.: US 11,492,894 B2
(45) Date of Patent: Nov. 8, 2022

(54) INSTRUMENTED TUBE FOR MEASURING FLOW FROM A WELLBORE BLOWOUT

(71) Applicant: Halliburton Energy Services, Inc., Houston, TX (US)

(72) Inventors: Arash Haghshenas, Houston, TX (US); Andrew John Cuthbert, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 482 days.

(21) Appl. No.: 16/310,850

(22) PCT Filed: Aug. 1, 2016

(86) PCT No.: PCT/US2016/044992
§ 371 (c)(1),
(2) Date: Dec. 18, 2018

(87) PCT Pub. No.: WO2018/026348
PCT Pub. Date: Feb. 8, 2018

(65) Prior Publication Data
US 2020/0308959 A1    Oct. 1, 2020

(51) Int. Cl.
*E21B 47/10* (2012.01)
*G01F 1/44* (2006.01)
*E21B 33/03* (2006.01)
*G01F 15/18* (2006.01)

(52) U.S. Cl.
CPC ............. *E21B 47/10* (2013.01); *E21B 33/03* (2013.01); *G01F 1/44* (2013.01); *G01F 15/18* (2013.01)

(58) Field of Classification Search
CPC . E21B 47/10; E21B 33/03; G01F 1/44; G01F 15/18
USPC ........................................................ 73/152.36
See application file for complete search history.

(56) References Cited

U.S. PATENT DOCUMENTS

| | | |
|---|---|---|
| 6,257,354 B1 * | 7/2001 | Schrader ............... G01F 23/296 175/48 |
| 8,960,281 B2 | 2/2015 | Epperson et al. |
| 2002/0174728 A1 | 11/2002 | Beresford et al. |
| 2006/0037782 A1 | 2/2006 | Martin-Marshall |
| 2010/0326654 A1 | 12/2010 | Hemblade et al. |
| 2012/0024052 A1 | 2/2012 | Eriksen |
| 2012/0251335 A1 | 10/2012 | Hurst et al. |

OTHER PUBLICATIONS

International Patent Application No. PCT/US2016/044992, "International Search Report and Written Opinion", dated Apr. 27, 2017, 15 pages.
CA3,026,580, "Office Action", dated Oct. 16, 2019, 4 pages.

\* cited by examiner

*Primary Examiner* — John Fitzgerald
*Assistant Examiner* — Rodney T Frank
(74) *Attorney, Agent, or Firm* — Kilpatrick Townsend & Stockton LLP

(57) ABSTRACT

A support arm can be positioned in an inner area of a tubular body. The support arm can extend from the inner surface of the tubular body to retain a sensor in flow from a wellbore blowout passing through the tubular body.

20 Claims, 9 Drawing Sheets

INSTRUMENTED TUBE FOR MEASURING FLOW FROM A WELLBORE BLOWOUT

TECHNICAL FIELD

The present disclosure relates generally to determining features of a wellbore blowout, and more particularly (although not necessarily exclusively), to an instrumented tube for measuring characteristics of flow from a wellbore blowout.

BACKGROUND

The term "blowout" is typically used to describe an uncontrolled flow of hydrocarbons and water out of a wellbore. Emergency response plans can be implemented by governmental agencies using specialized oil and gas service companies having expertise to respond to the blowout. Such plans and specific response procedures may be based on a set of assumptions, and in part on a highest-expected flow rate from the well, sometimes referred to as a worst-case discharge. However, the cost associated with an emergency response to a blowout can be very high, and acting according to a worst-case discharge can result in unnecessarily complex response. In controlling a blowout from a wellbore, the wellhead may be isolated by diverting heat, noise, and the flow of hydrocarbons away from the wellhead to create a safer environment for remedial activities.

DETAILED DESCRIPTION

Figure 1:
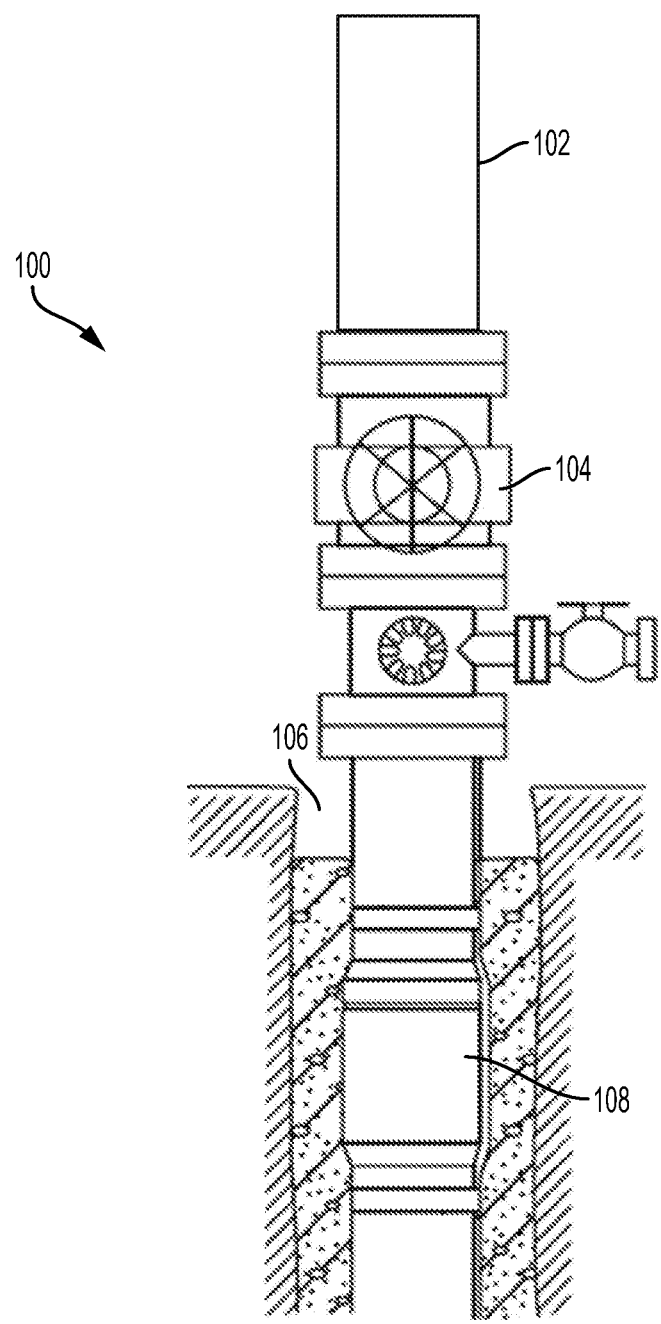
FIG. 1 is a cross-sectional diagram of an example of a well system with an instrumented tube positioned at an opening in a wellhead according to one aspect of the present disclosure.

Certain aspects and features relate to an instrumented tube for measuring characteristics of flow from an unintended flow event, such as a wellbore blowout. In an example implementation, the instrumented tube can be positioned at an opening in a wellbore to allow flow from a blowout to pass therethrough. The instrumented tube can include a sensor retained in the flow, such as by a support arm extending from an inner surface of the instrumented tube. The sensor can measure characteristics of the flow that can be analyzed to determine features of the blowout and the wellbore.

During the course of drilling or operating a wellbore, numerous safeguards are in place to help avoid a blowout, which can make these scenarios uncommon in comparison to the number of wells safely and successfully drilled throughout the world. However, on some occasions, a blowout can occur when a flow of liquid and gas are inadvertently discharged from an opening in the wellbore, such as due to an opening resulting from a damaged wellhead. The flow can have a composition and discharge rate based on features of the wellbore. In some examples, the flow may be intentionally ignited to reduce the pollutant discharge. In some cases it is possible for the flow to ignite inadvertently. Knowing the composition and the discharge rate of the flow can improve safety and allow for better response planning. In some aspects, an instrumented tube can be positioned at a location in a wellbore that is predicted to experience a blowout. The location can be determined based on past occurrences or on detected indicators of a potential blowout.

In some aspects, the systems and methods disclosed herein may include the use of an instrumented tube responsive to flow-related parameters such as a flow rate. Additional sensors and other hardware may be used to obtain, identify, and/or analyze flow-related parameters and other activity related to the blowout or other unintended flow event. The flow-related parameters may be analyzed using hardware implementing control logic and automation protocols. The instrumented tube can have a tubular body, such that if configured and positioned at the opening in the wellbore as described in some aspects herein, the instrumented tube may allow the flow to pass through an inner area of the tubular body. In some examples, the instrumented tube may be positioned around a portion of a wellhead with an opening therein, such that the opening is in the inner area of the tubular body. A support arm can be rigidly coupled to an inner surface of the tubular body to withstand contact with the flow. In some aspects, the support arm can include an inner channel and be positioned at an aperture in the tubular body to create a conduit between the sensor and an area external to the tubular body. A cable can be positioned in the conduit to provide power to the sensor and communicate measurements from the sensor to a transceiver.

In some aspects, the sensor can be coupled to the support arm such that the sensor is directly in the flow. In additional or alternative aspects, the sensor can be moved between a first position at which a portion of the sensor is directly in the flow and a second position at which the portion of the sensor is in an inner area of the support arm. The sensor can measure characteristics of the flow including a composition (e.g., ratio of gas, water, and oil), temperature, pressure, acoustic capacity, vibration, and thermal conductivity of the flow.

In some examples, the support arm can include two segments that each extend from an inner surface of the tubular body to a sensor housing in the center of the tubular body. The sensor housing can have a passage for allowing a portion of the flow to pass therethrough and the sensor can be positioned in the passage such that the sensor can be retained at a positon proximate the center of the tubular body. In additional or alternative aspects, the sensor may be housed in an inner area of the support arm and can measure characteristics of the portion of the flow in the passage. In some aspects, the sensor can measure characteristics of the flow while isolated from direct contact with the flow. For example, a temperature of the flow can be measured by a sensor while the sensor is housed in the inner area of the support arm.

In some aspects, the characteristics of the flow can be analyzed to determine an actual discharge rate of a blowout. Knowledge of the actual discharge rate can allow response efforts (e.g., spill containment efforts, relief well designs, and dynamic kill analysis) to be based on actual well conditions rather than worst-case discharge models. Response efforts based on the actual well conditions can reduce the overall response time, environmental damage, and cost incurred by a well operator after a blowout.

In additional or alternative aspects, the characteristics of the flow can be analyzed to determine features of the wellbore such as reservoir pressure, reservoir performance, and reservoir depletion rate. Knowledge of these features can allow operators to make more efficient use of the wellbore. In some examples, reducing the uncertainty of operations can expedite the process of acquiring relevant permits.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional diagram of an example of a well system 100 with an instrumented tube 102. The well system 100 includes a wellhead 104 coupled to a tubing string 108 that extends into a wellbore 106. The wellbore 106 can extend through various earth strata and can include a substantially vertical section and a substantially horizontal section. In some examples, the wellbore 106 can include a casing string cemented to an upper segment of the wellbore 106. In additional or alternative examples, a wellbore can be an open-hole environment or can include multiple lateral bores.

During a blowout, a flow of hydrocarbons and water in the wellbore 106 can be discharged through an opening in the wellhead 104. The instrumented tube 102 can be positioned at the opening in the wellhead 104 such that a portion of the flow passes through the instrumented tube 102. The instrumented tube 102 can include a sensor retained in flow from the blowout by a support arm extending from an inner surface of the instrumented tube 102. The sensor can measure characteristics of the flow for determining features of the blowout and the wellbore 106. For example, the sensor can measure a discharge rate characteristic that can be used to determine wellbore dynamics, pressure, and velocity profiles along the wellbore 106. The measurements from the sensor can also be used to evaluate reservoir pressure, reservoir performance, and reservoir depletion rate.

In some aspects, the instrumented tube 102 can be positioned at the opening in the wellhead 104. For example, the instrumented tube 102 can be positioned around a portion of the wellhead 104 with the opening such that the portion of the wellhead 104 can be in an inner area of the instrumented tube 102. In additional or alternative examples, the instrumented tube 102 can be positioned above the opening. The instrumented tube 102 can be positioned such that a center of the opening is axially aligned with a longitudinal axis of the instrumented tube 102. The instrumented tube 102 can also be positioned approximately perpendicular to the ground to divert the flow up and away from the wellbore 106. In some examples, the wellhead 104 extends from the wellbore 106 at an angle and the instrumented tube 102 can be aligned with a longitudinal axis of the flow at the opening.

In some examples, the instrumented tube 102 can be a cylindrical steel tube that is approximately twenty feet long. Although the instrumented tube 102 is depicted as cylindrical, an instrumented tube can take any shape having a channel for allowing the flow to pass therethrough. For example, an instrumented tube can be a rectangular prism with a channel therethrough. In some aspects, an instrumented tube can be positioned at a location in a wellbore that is prone to blowouts in preparation for a blowout. An instrumented tube can also be positioned at a location based on information measured at the wellbore indicating potential locations for an opening to form during a blowout. In additional or alternative aspects, an instrumented tube can be positioned at an opening during a blowout.

Figure 2:
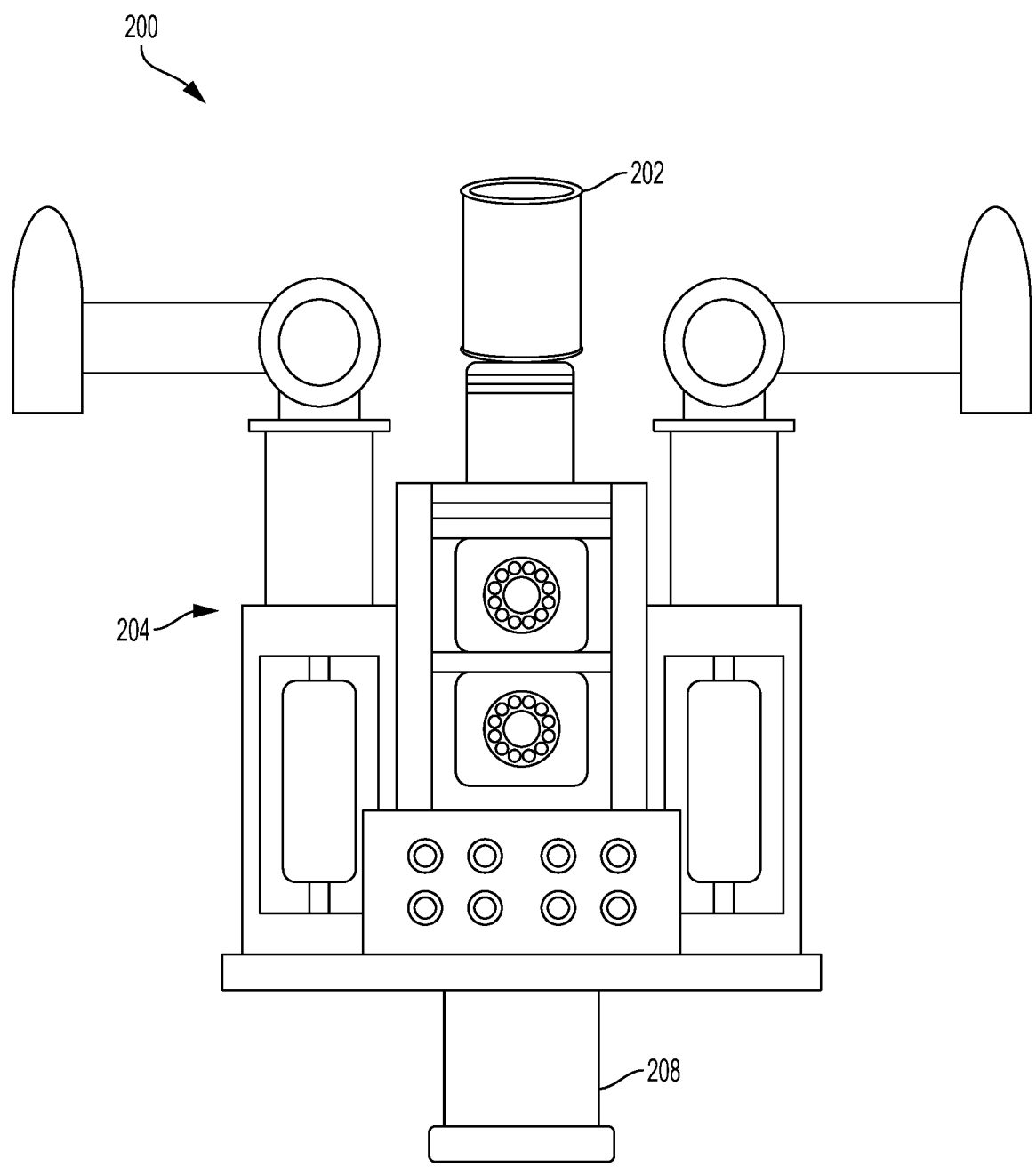
FIG. 2 is a perspective view of an example of a subsea well system with an instrumented tube positioned at an opening in a capping stack according to one aspect of the present disclosure.

FIG. 2 is a perspective view of a subsea well system 200 with an instrumented tube 202. The subsea well system 200 can include a capping stack 204 for capping a blowout from a subsea wellbore. The capping stack 204 can include a connector tubing 208 for connecting to a blowout preventer or extending into the subsea wellbore. A flow from the blowout can move through the connector tubing 208 and into the capping stack 204. The instrumented tube 202 can be positioned at an opening in the capping stack 204 for allowing the flow to pass therethrough. The instrumented tube 202 can be positioned between the capping stack 204 and tubing that can extend to a vessel or an oil platform at the surface of the water. Although FIG. 2 depicts instrumented tube 202 positioned at an opening in the capping stack 204, an instrumented tube can be positioned between a blowout preventer and a capping stack such that flow from a blowout flows through the instrumented tube and into the capping stack. In some examples, an instrumented tube can be positioned between a capping stack and a blowout preventer such that flow from a blowout flows through the instrumented tube from the capping stack to the blowout preventer. In other examples, an instrumented tube can be positioned at an opening in a subsea wellbore to allow flow from a blowout to flow directly from the subsea wellbore through the instrumented tube.

Figure 3A:
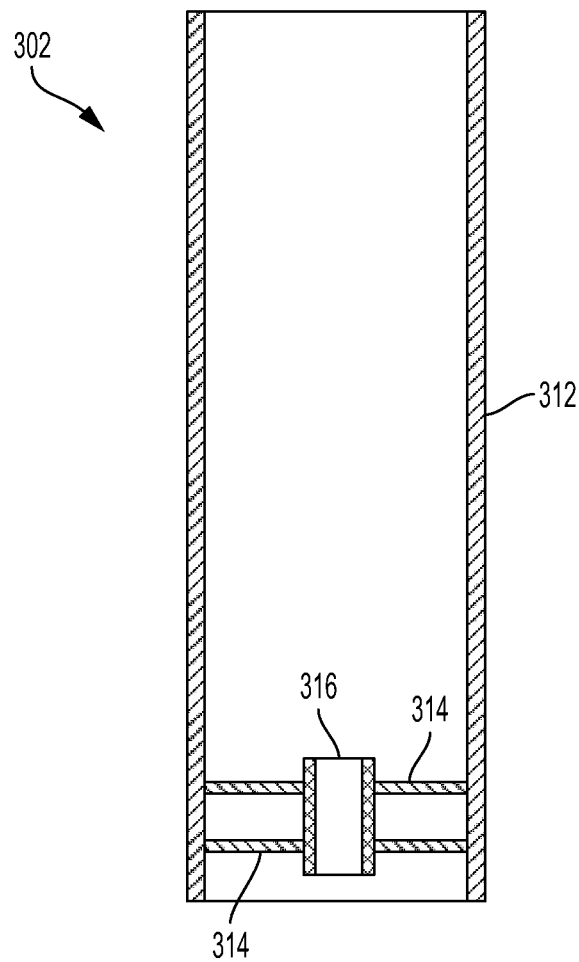
FIG. 3A is a cross-sectional side view of an instrumented tube according to one aspect of the present disclosure.
Figure 3B:
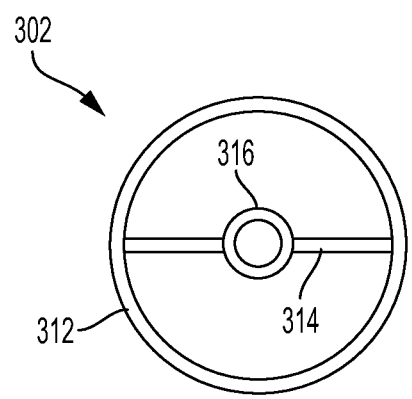
FIG. 3B is an end view of the instrumented tube in FIG. 3A having a sensor housing retained by a support arm according to one aspect of the present disclosure.

FIGS. 3A-B are a cross-sectional side view and an end view, respectively, of an instrumented tube 302, which can be similar to one of the instrumented tubes 102, 202 in FIG. 1 or 2. The instrumented tube 302 includes a tubular body 312, support arms 314, and a sensor housing 316. The tubular body 312 can have an inner area such that the instrumented tube 302 can be positioned to allow flow from a blowout to pass through the inner area. The support arms 314 can extend from a first portion of an inner surface of the tubular body 312 to a second portion of the inner surface of the tubular body 312. The sensor housing 316 can be coupled to the support arms 314 and retained in the inner area of the tubular body 312. In additional or alternative aspects, the support arms 314 can have a first end coupled to the inner surface of the tubular body 312 and a second end coupled to the sensor housing 316.

In some examples, the flow can travel through the tubular body 312 at a high velocity and the flow can be ignited to reach a temperature in excess of 2000° F. In some aspects, the support arms 314 can be made of a material to withstand contact with the flow so that a sensor coupled to the support arms 314 can measure characteristics of the flow. An example of such a material is a titanium alloy, but other materials can be used. In additional or alternative examples, the support arm 314 can be threaded and screwed through a threaded opening in the tubular body 312 or welded to the inner surface of the tubular body 312.

The sensor housing 316 can have a passage for allowing the flow from a blowout to pass therethrough and the sensor housing 316 can be coupled to the support arms 314 such that a longitudinal axis of the passage is substantially parallel to the flow. In some aspects, sensors can be housed in the passage of the sensor housing 316 such that the sensors can be exposed to the flow from the blowout. Although two support arms 314 are depicted in FIG. 3A, an instrumented tube according to other examples can include one support arm or more than two support arms. In some examples, a sensor can be directly coupled to a support arm 314. In additional or alternative examples, the support arm 314 can have an inner passage and the sensor can be positioned in the inner passage. Although FIG. 3A depicts a single sensor housing 316 supported by both support arms 314, an instrumented tube according to other examples can include more than one sensor housing and each support arm 314 can retain more than one sensor or sensor housing in the flow. Although the support arms 314 are depicted as passing through the center of the tubular body 312, support arms can extend through any portion of the inner area.

Figure 4:
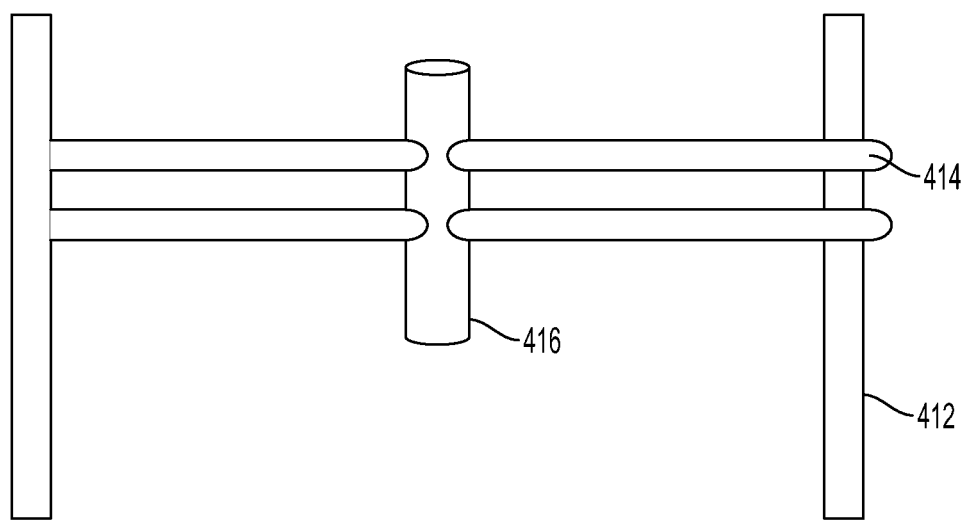
FIG. 4 is a perspective view of a sensor housing retained in an inner area of part of an instrumented tube according to one aspect of the present disclosure.

FIG. 4 is a perspective view of a sensor housing 416 retained in an inner area of a part of a tubular body 412 by support arms 414. The tubular body 412 includes two apertures that form a passage between an inner area of the tubular body 412 and an area external to the tubular body 412. The support arms 414 each have a first end that extends from an inner surface of the tubular body 412 and a second end positioned to pass through an aperture in the tubular body 412.

In some aspects, the support arms 414 can include an internal passage creating a conduit between the sensor housing 416 and an area external to the tubular body 412. Sensors can be inserted and retrieved from the inner area of the tubular body 412 through the conduit. Wiring for the sensors can be positioned in the conduit for providing power and communication to the sensors from a device external to the tubular body 412. In additional or alternative examples, a sensor can include a plasma source housed in a first segment of the support arm 414 that transmits a plasma beam through an inner area of the sensor housing 416 to a plasma detector housed in a second segment of the support arm 414.

Although the support arms 414 are depicted as passing through the apertures in tubular body 412, other arrangements are possible. For example, a support arm may pass through only a portion of an aperture. Alternatively, a support arm may be coupled to an inner surface of the tubular body 412 around an aperture. A support arm can also extend from a first aperture in a tubing body to a second aperture in the tubular body.

Figure 5:
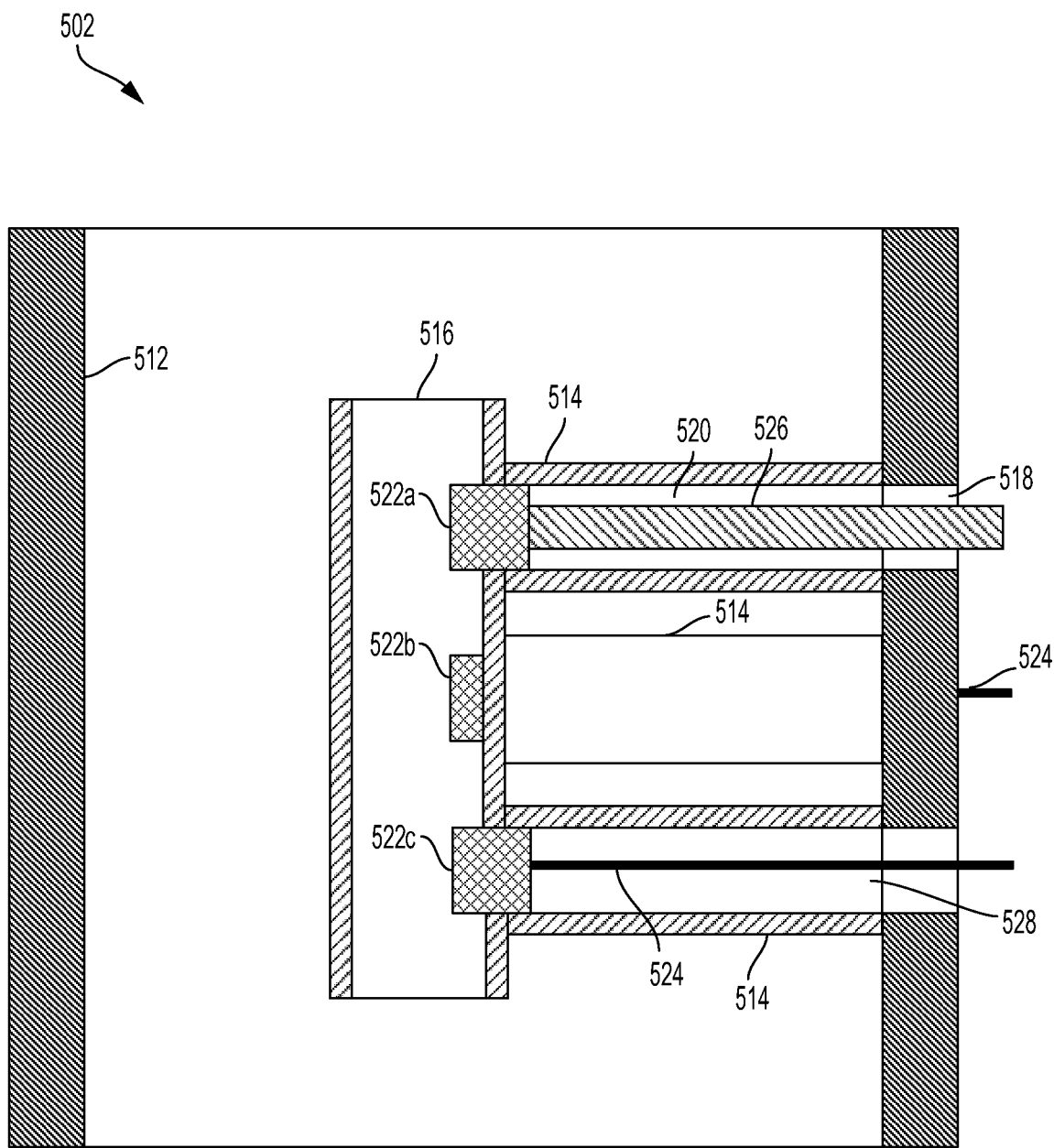
FIG. 5 is a cross-sectional diagram of an example of a sensor housing retained in an inner area of part of an instrumented tube according to one aspect of the present disclosure.

FIG. 5 is a cross-sectional diagram of part of an instrumented tube 502 with a tubular body 512 and a sensor housing 516. The sensor housing 516 can be retained in an inner area of the tubular body 512 by support arms 514 such that flow from a blowout passes through the sensor housing 516. The support arms 514 can have an inner area 520, and the support arms 514 can be positioned at apertures 518 in the tubular body 512 to form a conduit 528 between the sensor housing 516 and an area external to the instrumented tube. A portion of sensors 522a-c can be positioned in the sensor housing 516 such that the sensors 522a-c can be directly exposed to the flow. A rod 526 can extend from sensor 522a through the conduit 528 to an area external to the instrumented tube 502. Communication media 524 (e.g., copper wire) can be positioned in conduits 528 and coupled to sensors 522b-c.

In some examples, sensor 522a can be inserted into sensor housing 516 by sliding the rod 526 through the inner area 520. In additional or alternative examples, the rod 526 can be used to move the sensor 522a from a position directly in the flow to a position indirectly in the flow and housed in the support arm 514. In some aspects, the rod 526 can be a pitot tube for measuring a pressure of the flow.

The communication media 524 can provide a signal path for the sensor 522b-c to transmit data based on measurements of the flow to a transceiver external to the instrumented tube 502. The communication media 524 can also provide power to the sensor 522b. In additional or alternative aspects, sensors 522a-c can be communicatively coupled to a wireless communication circuit for wirelessly communicating measurements to the transceiver external to the instrumented tube 502. The communication circuit can communicate with the transceiver using any suitable wireless technology including, but not limited to cellular, Bluetooth, or Wi-Fi.

Examples of sensors 522a-c can include a thermometer, pressure transducer, acoustic pressure sensor, thermal conductivity sensor, gas and liquid spectral analyzer, and vibration sensor. In some aspects, a sensor can be coupled to a rod and communicatively coupled to a communication medium. The rod and the communication medium may both be positioned in a single conduit between a sensor housing and an area external to the instrumented tube.

Although FIG. 5 depicts the support arms 514 as extending from an inner surface of the tubular body 512 at an angle substantially perpendicular to a longitudinal axis of the tubular body 512, support arms can extend at any angle. In some aspects, support arms can extend from three portions of an inner surface of a tubular body and converge at a location in an inner area of the tubular body. Alternatively, a single support arm can extend from an inner surface of the tubular body to retain a sensor or a sensor housing in flow from a blowout.

Figure 6:
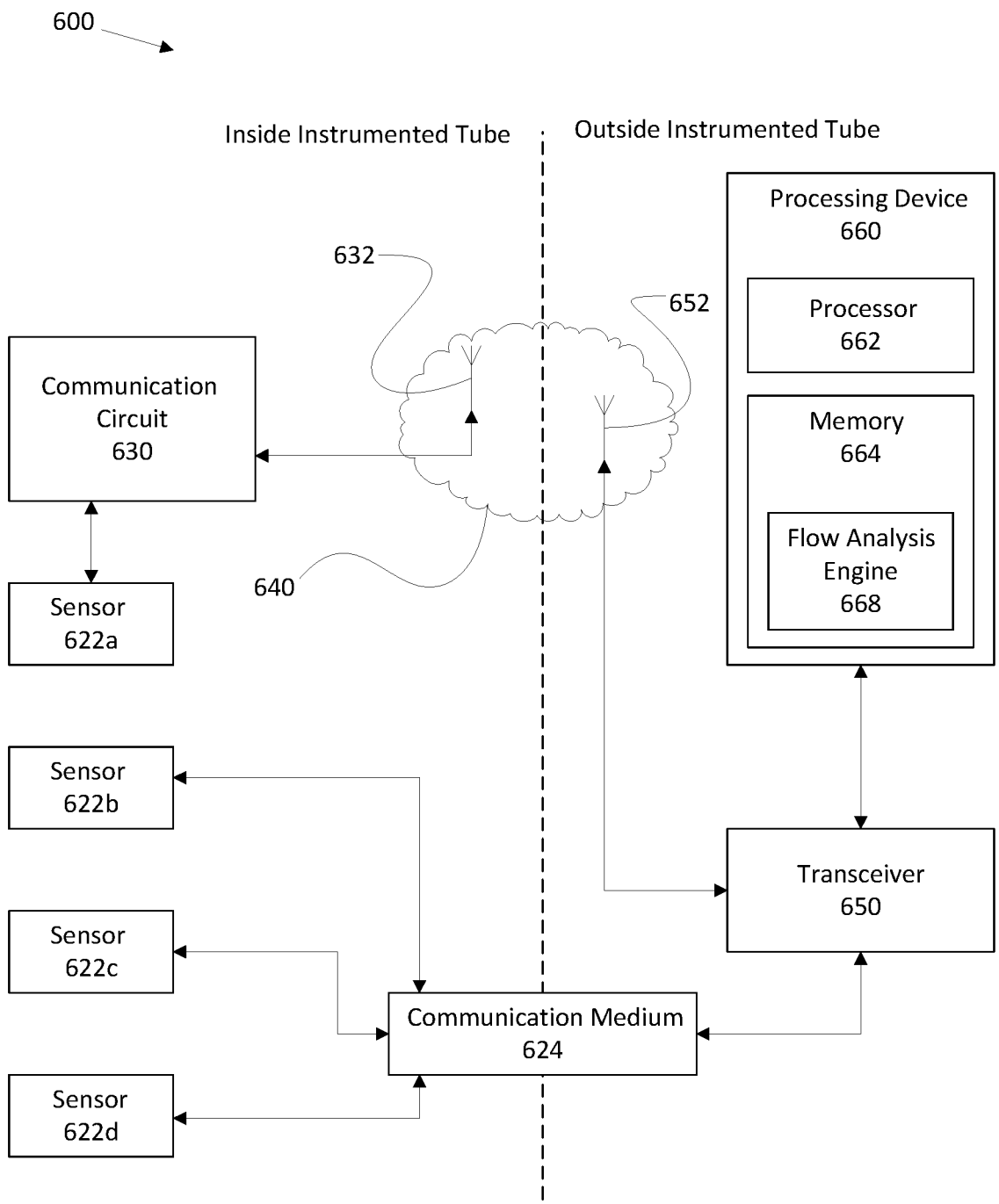
FIG. 6 is a block diagram of an example of a system for communicating data from sensors retained in an inner area of an instrumented tube to devices external to the instrumented tube according to one aspect of the present disclosure.

FIG. 6 is a block diagram of an example of a system 600 for communicating data from sensors 622a-d retained in an inner area of an instrumented tube to devices external to the instrumented tube. The system 600 can include a sensor 622a communicatively coupled to a communication circuit 630, which can be communicatively coupled to an antenna 632. The antenna 632 can be part of a wireless network 640 that can also include an antenna 652 associated with a transceiver 650. Sensors 622b-d can be communicatively coupled to the transceiver 650 via a communication medium 624 (e.g., a copper wire). The transceiver 650 can be communicatively coupled to a processing device 660.

The sensors 622a-d can be retained in flow from a wellbore blowout to measure data about the flow. The data can be transmitted by the sensors 622a-d to the processing device 660 for analysis. Communication circuit 630 can communicate with transceiver 650 using any suitable wireless technology including, but not limited to cellular, Bluetooth, Near Field Communication ("NFC"), or Wi-Fi. In some aspects, a sensor can include a communication circuit and an antenna for wirelessly communicating with devices in an inner area of the instrumented tube and devices external to the instrumented tube. The communication circuit 630 and sensor 622a can be powered by a signal received over wireless network 640. Communication medium 624 can be positioned in a conduit that connects an inner area of the instrumented tube with an external area. In some examples, the sensors 622b-d can receive power over the communication medium 624.

Transceiver 650 can include additional instruments for measuring wellsite conditions, such as weather. These conditions can be communicated to the sensors 622a-d to adjust measurement criteria. The processing device 660 can include any number of processors 662 for executing program code. Examples of the processing device 660 can include a microprocessor, an application-specific integrated circuit ("ASIC"), a field-programmable gate array ("FPGA"), or other suitable processing device. In some aspects, the processing device 660 can be a dedicated processing device for analyzing data based on characteristics of the flow. In other aspects, the processing device 660 can be used for controlling wellbore operations.

The processing device 660 can include (or be communicatively coupled with) a non-transitory computer-readable memory 664. The memory 664 can include one or more memory devices that can store program instructions. The program instructions can include, for example, a flow analysis engine 668 that can be executable by the processing device 660 to perform certain operations described herein.

In some examples, the operations can include requesting measurement data from sensors 622a-d. In additional or alternative examples, the operations can include instructing a rod to move for adjusting a position of a sensor 622a-d such that the sensor 622a-d is more or less exposed to the flow. In some examples, the operations can include analyzing data from the sensors 622a-d to determine features of the blowout and the wellbore. For example, the processing device 660 can determine features of the wellbore such as reservoir pressure, reservoir performance, and reservoir depletion rate.

Figure 7:
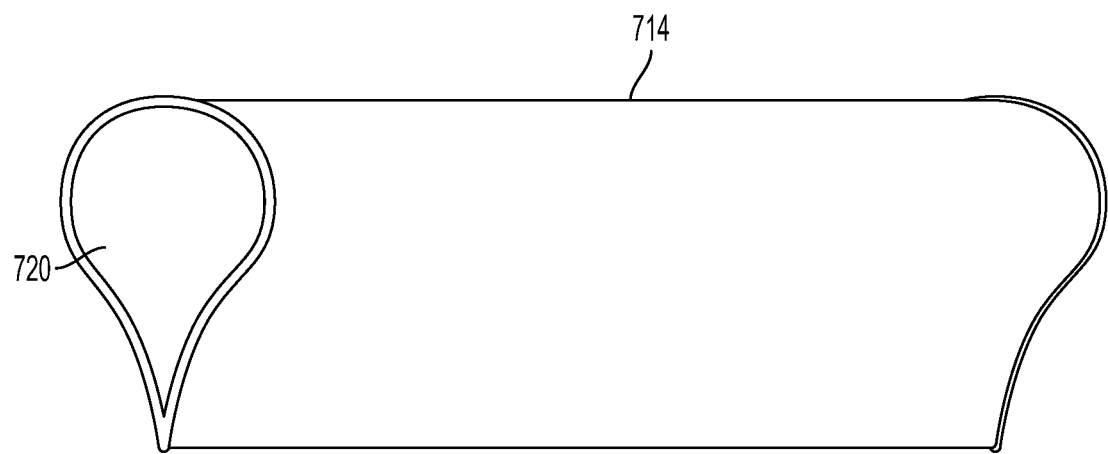
FIG. 7 is a perspective view of an example of a support arm with a profiled shape according to one aspect of the present disclosure.

FIG. 7 is a perspective view of a support arm 714 with a profiled shape for reducing an impact of the support arm 714 on a direction and a velocity of a portion of the flow that contacts the support arm 714. The profiled shape can include an edge facing a direction that is substantially opposite of a direction the flow is moving through an instrumented tube. The sides of the profiled shape can extend from the edge in substantially the same direction the flow is moving to reduce a deflection of the flow as it contacts the support arm. In some examples, a profiled shape can substantially limit the deflection of the portion of the flow contacting the support arm 714 to an angle in the range of −45° to 45° relative to the direction the flow was moving.

Although a cross section of the support arm 714 depicted in FIG. 7 has a teardrop shape, a profiled support arm can have any cross sectional shape that reduces the impact of the support arm on the direction and the velocity of the flow. For example, the cross section of a support arm can have a wedge shape. Although the support arm 714 is depicted a having an inner passage 720 with a similar profiled shape as the support arm 714, in some aspects a support arm with a profiled shape can be solid. In additional or alternative aspects, a support arm can have a profiled shape and have an inner passage of any shape.

Figure 8:
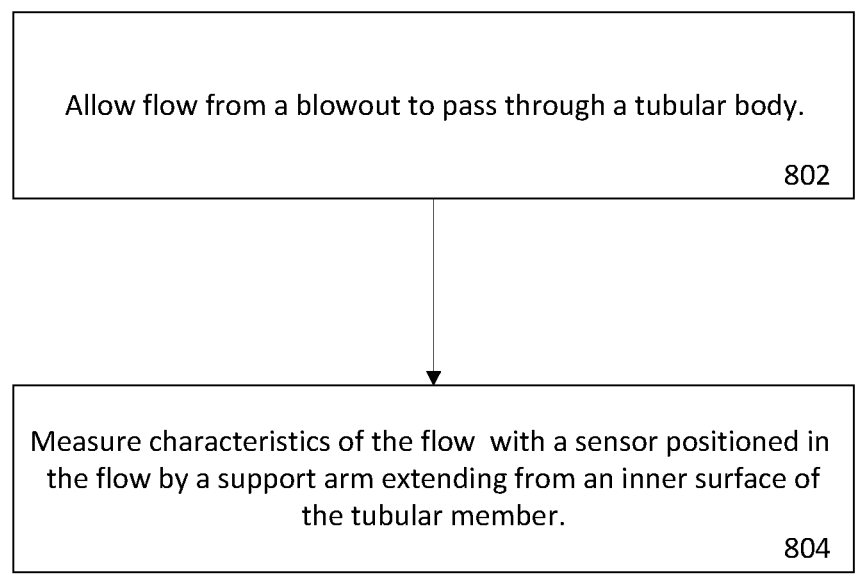
FIG. 8 is a flow chart of an example of a process for measuring characteristics of flow from a blowout with an instrumented tube according to one aspect of the present disclosure.

FIG. 8 is a flow chart of an example of a process for measuring characteristics of flow from a blowout with an instrumented tube. A blowout can occur when a flow of hydrocarbons are inadvertently emitted from an opening in a wellbore. In some examples, the opening in the wellbore can be in a wellhead coupled to a tubing string extending into the wellbore. In additional or alternative examples, the wellbore may be a subsea wellbore and the opening may be in a capping stack. Measuring the characteristics of the flow with an instrumented tube can improve the working conditions proximate the opening in the wellbore and provide information for treatment of the wellbore.

In block 802, flow from a blowout is allowed to pass through a tubular body of an instrumented tube. The tubular body has a passage therethrough and can be positioned at the opening in the wellbore to allow the flow to pass through the passage. In some examples, the opening in the wellbore is in a portion of a wellhead and the tubular body is positioned such that the portion of the wellhead is in the passage. In additional or alternative examples, the instrumented tube is a Venturi tube that creates a suction force as the flow passes through the tubular body, and the Venturi tube is positioned proximate the opening such that the flow can be pulled through the Venturi tube by the suction force.

In block 804, characteristics of the flow are measured with a sensor positioned in the flow by a support arm extending from an inner surface of the tubular body. The flow can have a velocity and composition based on the pressure and condition of the wellbore. The support arm can be rigidly coupled to the tubular body to withstand contact with the flow. In some examples, the support arm can be titanium and welded to the tubular body. In additional or alternative examples, the support arm can be threaded and screwed through a threaded opening in the tubular body. In some aspects the support arm can extend from a first portion of the inner surface of the tubular body to a second portion of the inner surface of the tubular body. In additional or alternative aspects, one or two or more support arms can extend from the inner surface of the tubular body to position the sensor in the flow.

In some aspects, the sensor can be coupled to the support arm such that the sensor is directly in the flow. In additional or alternative aspects, the sensor may be moved between a first position at which the sensor is directly in the flow and a second position at which the sensor is in an inner area of the support arm. The sensor can measure characteristics of the flow including the composition (e.g., ratio of gas, water, and oil), temperature, pressure, acoustic capacities, vibration, and thermal conductivity of the flow. In some aspects, more than one sensor can be coupled to the support arm such that at least one of the sensors can be directly in the flow. The sensors can be independently moved and some of the sensors can be directly exposed to the flow while other sensors are indirectly in the flow. The sensors can take multiple measurements of different characteristics of the flow.

Figure 9:
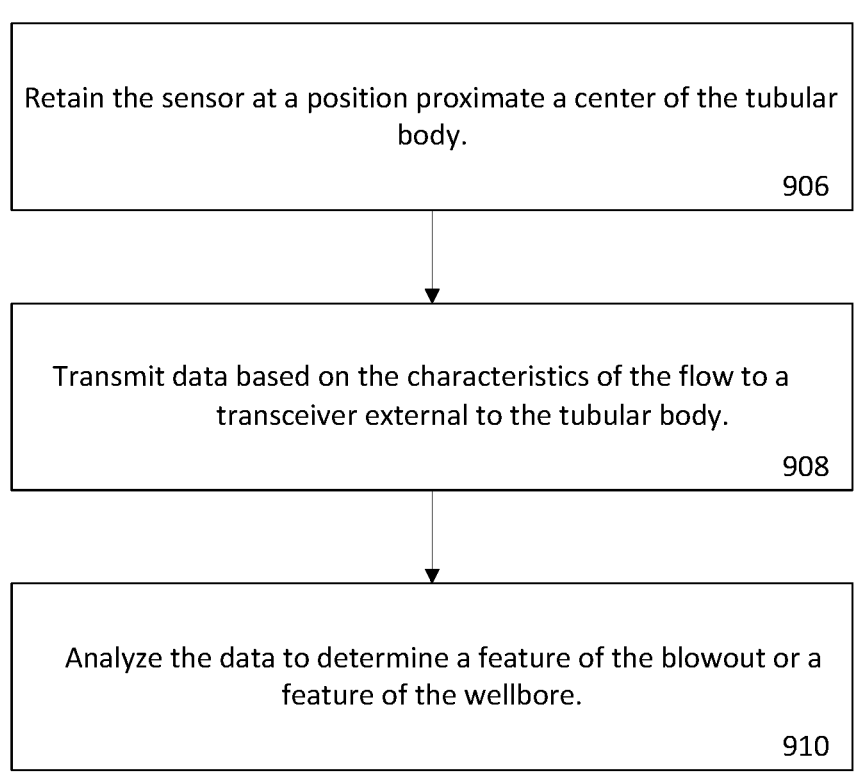
FIG. 9 is a flow chart of an example of a process for determining a feature of a blowout or a feature of a wellbore based on characteristics measured by sensors in flow from the blowout according to one aspect of the present disclosure.

FIG. 9 is a flow chart of an example of a process for determining a feature of a blowout or a feature of a wellbore based on the characteristics measured by sensors in the flow. The process can include the steps in block 802 and block 804 of FIG. 8. As described above, these steps can include the flow from a blowout being allowed to pass through a tubular body and characteristics of the flow being measured with a sensor positioned in the flow by a support arm extending from an inner surface of the tubular body.

In block 906, the sensor can be retained at a position proximate a center of the tubular body. In some examples, the support arm can include two segments that each extend from an inner surface of the tubular body to a sensor housing in the center of the tubular body. The sensor housing can have a passage for allowing a portion of the flow to pass therethrough and the sensor can be positioned in the passage such that the sensor is retained at a positon proximate the center of the tubular body. In additional or alternative aspects, the sensor can be housed in an inner area of the support arm and may measure characteristics of the portion of the flow in the passage. For example, the sensor can include a plasma source housed in a first segment of a support arm that transmits a plasma beam across the passage to a plasma detector housed in a second segment of the support arm. In some aspects, the sensor can measure characteristics of the flow without being directly in the flow. For example, a temperature or a pressure of the flow can be measured by a sensor while the sensor is housed in the inner area of the support arm.

In block 908, data based on the characteristics of the flow can be transmitted to a transceiver external to the tubular body. The data can be communicated using any suitable communication medium. In some examples, the sensors can be communicatively coupled to a wireless communication circuit for wirelessly communicating the data to the transceiver. In additional or alternative examples, the support arm can be positioned at an opening in the tubular body, and the support arm can have a passage therethrough such that a conduit is formed between the sensor and an area external to the tubular body. A cable can be housed in the conduit to communicatively couple the sensor to the transceiver.

In block 910, the data can be analyzed by a processing device to determine a feature of the blowout or the wellbore. In some examples, the data can be analyzed to determine the discharge rate, which can allow response efforts (e.g., spill containment efforts, relief well design, and dynamic kill analysis) to be based on actual well conditions rather than hypothetical worst-case discharge models. Tailoring the response efforts can reduce the overall response time, environmental damage, and cost incurred by the well operator. In additional or alternative examples, the data can be analyzed to evaluate features of the wellbore such as reservoir pressure, reservoir performance, and reservoir depletion rate. Knowledge of these features can allow operators to make more efficient use of the wellbore.

In some aspects, an instrumented tube for measuring characteristics of flow from a wellbore blowout is provided according to one or more of the following examples:

Example #1: A device can include a support arm. The support arm can be positioned in an inner area of a tubular body. The support arm can extend from an inner surface of the tubular body to retain a sensor in flow from a wellbore blowout passing through the tubular body.

Example #2: The device of Example #1, can feature the tubular body having an aperture in the inner surface of the tubular body. The support arm can include an inner passage, and the support arm can be positioned at the aperture to form a conduit between the sensor and an area external to the tubular body.

Example #3: The device of Example #2, can feature the support arm retaining the sensor in the flow to measure a characteristic of the flow. The support arm can include a communication medium positioned in the conduit and communicatively coupled to the sensor. The communication medium can allow data based on the characteristic of the flow to be communicated between the sensor and a transceiver located externally to the tubular body for analysis to determine a feature of the blowout or the wellbore.

Example #4: The device of Example #1, can feature the sensor being a plurality of sensors. The device can further include a sensor housing coupled to the support arm. The sensor housing can include a channel to allow the flow to pass therethrough and for housing the plurality of sensors.

Example #5: The device of Example #4, can feature a segment of the support arm defining an inner space. At least one sensor of the plurality of sensors can be moved between a first position at which the at least one sensor can be in the inner space to a second position at which the at least one sensor can be in the sensor housing and exposed to the flow.

Example #6: The device of Example #1, can feature the support arm positioned to extend from a first part of the inner surface of the tubular body to a second part of the inner surface of the tubular body. The support arm can have a profiled shape having an edge closer to the opening in the wellbore than any other portion of the support arm.

Example #7: The device of Example #1, can feature the sensor retained at a position proximate a center of the tubular body by the support arm.

Example #8: The device of Example #1, can feature the tubular body as a Venturi tube positioned at a wellhead to divert the flow of the blowout away from the wellhead.

Example #9: The device of Example #1, can feature the tubular body as part of a capping stack. The wellbore can be a subsea wellbore.

Example #10: An assembly can include a tubular body, a support arm, and a sensor housing. The tubular body can be positioned at an opening in a wellhead of a wellbore to allow a flow of a blowout to pass therethrough and away from the wellhead. The support arm can extend from a first portion of an inner surface of the tubular body to a second portion of the inner surface of the tubular body. The sensor housing can be coupled to the support arm and can house a sensor such that the sensor is in the flow for measuring characteristics of the flow.

Example #11: The assembly of Example #10, can feature the tubular body including an aperture in the first portion of the inner surface. A segment of the support arm can include an inner passage forming a conduit between the sensor housing and an area external to the tubular body.

Example #12: The assembly of Example #11, can further include a communication medium positioned in the conduit and communicatively coupled to the sensor. The communication medium can be used for communicating data based on the characteristics of the flow between the sensor and a transceiver external to the tubular body.

Example #13: The assembly of Example #10, can feature the sensor housing being retained at a position proximate a center of the tubular body by the support arm.

Example #14: The assembly of Example #10, can feature the support arm having a profiled shape with an edge closer to the opening in the wellbore than any other part of the of the support arm. The profiled shape can limit a deflection of a portion of the flow that contacts the support arm to an angle range of −45° to 45° relative to a direction the portion of the flow was traveling through the tubular body.

Example #15: The assembly of Example #10, can further include a processing device communicatively coupled to the sensor to analyze the characteristics of the flow to determine a feature of the blowout or a feature of the wellbore.

Example #16: The assembly of Example #10, can feature the support arm being a plurality of support arms that extends from the inner surface of the tubular body. The sensor can be a plurality of sensors positioned in an inner area of the tubular body for measuring the characteristics of the flow. The assembly can further include a communication circuit communicatively coupled to at least one sensor of the plurality of sensors to wirelessly communicate data based on the characteristics of the flow to a transceiver external to the tubular body.

Example #17: A method can include allowing flow from a blowout to pass through a tubular body positioned at an opening in a wellbore. The method can further include measuring characteristics of the flow by a sensor positioned in the flow of the blowout by a support arm extending from an inner surface of the tubular body.

Example #18: The method of Example #17, can further include retaining the sensor at a position proximate a center of the tubular body by positioning the sensor in a sensor housing coupled to the support arm. The support arm can extend from a first part of the inner surface of the tubular body to a second part of the inner surface of the tubular body.

Example #19: The method of Example #1, can further include transmitting data based on the characteristics of the flow over a cable communicatively coupled to the sensor to a transceiver external to the tubular body. A portion of the cable can be housed in the support arm and the cable can pass through an aperture in the inner surface of the tubular body.

Example #20: The method of Example #19, can further include analyzing the data by a processing device communicatively coupled to the transceiver to determine a feature of the blowout or a feature of the wellbore.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A device comprising:
  a support arm positioned in an inner area of a tubular body and extending from an inner surface of the tubular body to retain a sensor in flow from a wellbore blowout passable through the tubular body, wherein the support arm has an inner passage providing access to the sensor for moving or retrieving the sensor, wherein a first portion of the sensor is positioned in a flow path of the flow and a second portion of the sensor is positioned within the inner passage of the support arm; and
  a sensor housing positioned within the inner area of the tubular body and coupled to the support arm for housing the sensor.

2. The device of claim 1, wherein the tubular body comprises an aperture in the inner surface of the tubular body,
  wherein the support arm is positioned at the aperture to form a conduit between the sensor and an area external to the tubular body.

3. The device of claim 2, wherein the support arm is positionable to retain the sensor in the flow for measuring a characteristic of the flow, wherein the support arm includes a communication medium positioned in the conduit and communicatively coupled to the sensor for communicating data based on the characteristic of the flow between the sensor and a transceiver located externally to the tubular body for analysis to determine a feature of the wellbore blowout or a wellbore.

4. The device of claim 1, wherein the sensor is a plurality of sensors, and wherein the sensor housing further comprises a channel to allow the flow to pass therethrough and for housing the plurality of sensors.

5. The device of claim 4, wherein at least one sensor of the plurality of sensors is moveable between a first position at which the at least one sensor is in the inner passage to a second position at which the at least one sensor is in the sensor housing and exposed to the flow.

6. The device of claim 1, wherein the support arm is positioned to extend from a first part of the inner surface of the tubular body to a second part of the inner surface of the tubular body, wherein the support arm comprises a profiled shape having an edge closer to an opening in a wellbore than any other portion of the support arm.

7. The device of claim 1, wherein the sensor is retained at a position proximate a center of the tubular body by the support arm.

8. The device of claim 1, wherein the tubular body is a Venturi tube positioned at a wellhead to divert the flow of the wellbore blowout away from the wellhead.

9. The device of claim 1, wherein the tubular body is part of a capping stack, and the device is positionable in a subsea wellbore.

10. The device of claim 9, wherein the capping stack is coupled to a blowout preventer, and wherein the sensor is positioned to measure a characteristic of flow from the blowout preventer.

11. An assembly comprising:
  a tubular body positionable at an opening in a wellhead of a wellbore to allow a flow of a wellbore blowout from the wellhead to pass therethrough;
  a support arm extending from a first portion of an inner surface of the tubular body to a second portion of the inner surface of the tubular body, wherein the support arm has an inner passage providing access to a sensor of a plurality of sensors for moving or retrieving the sensor, wherein a first portion of a sensor of the plurality of sensors is positioned in a flow path of the flow and a second portion of the sensor of the plurality of sensors is positioned within the inner passage of the support arm; and
  a sensor housing positioned within the tubular body and coupled to the support arm and housing the plurality of sensors such that the plurality of sensors are positionable in the flow for measuring characteristics of the flow.

12. The assembly of claim 11, wherein the tubular body comprises an aperture in the first portion of the inner surface, wherein the inner passage is positionable to form a conduit between the sensor housing and an area external to the tubular body.

13. The assembly of claim 12, further comprising a communication medium positionable in the conduit and communicatively coupled to the plurality of sensors for communicating data based on the characteristics of the flow between the plurality of sensors and a transceiver external to the tubular body.

14. The assembly of claim 11, wherein the sensor housing is retained at a position proximate a center of the tubular body by the support arm.

15. The assembly of claim 11, wherein the support arm has a profiled shape having an edge closer to the opening in the wellbore than any other part of the support arm for limiting a deflection of a portion of the flow that contacts the support arm to an angle range of −45° to ±45° relative to a direction the portion of the flow was traveling through the tubular body.

16. The assembly of claim 11, further comprising:
a processing device communicatively coupled to the plurality of sensors to analyze the characteristics of the flow to determine a feature of the wellbore blowout or a feature of the wellbore.

17. The assembly of claim 11, wherein the support arm is a plurality of support arms that extends from the inner surface of the tubular body, the assembly further comprising:
a communication circuit communicatively coupled to at least one sensor of the plurality of sensors to wirelessly communicate data based on the characteristics of the flow to a transceiver external to the tubular body.

18. A method comprising:
allowing flow from a blowout to pass through a tubular body positioned at an opening in a wellbore;
positioning a sensor in a flow path of the blowout by inserting the sensor through a support arm and into a sensor housing positioned in the flow path and within the tubular body using an insertion element, the support arm being coupled to the sensor housing and extending from an inner surface of the tubular body;
measuring characteristics of the flow by the sensor; and
transmitting data based on the characteristics of the flow, through a cable communicatively coupled to the sensor, to a transceiver external to the tubular body, wherein a portion of the cable is housed in the support arm and the cable passes through an aperture in the inner surface of the tubular body.

19. The method of claim 18, further comprising:
retaining the sensor at a position proximate a center of the tubular body by positioning the sensor in the sensor housing coupled to the support arm, the support arm extending from a first part of the inner surface of the tubular body to a second part of the inner surface of the tubular body.

20. The method of claim 18, further comprising:
analyzing the data by a processing device communicatively coupled to the transceiver to determine a feature of the blowout or a feature of the wellbore.

* * * * *